United States Patent [19]

Thiele

[11] Patent Number: 5,361,903
[45] Date of Patent: Nov. 8, 1994

[54] REEL CONTAINER FOR MAGNETIC TAPES

[75] Inventor: Hartmut Thiele, Munich, Germany

[73] Assignee: BASF Maonetics GmbH, Mannheim, Germany

[21] Appl. No.: 117,312

[22] Filed: Sep. 7, 1993

[30] Foreign Application Priority Data

Sep. 11, 1992 [DE] Germany .............. 9212275.2[U]

[51] Int. Cl.⁵ ........................................... B65D 85/672
[52] U.S. Cl. ................................. 206/403; 206/404; 206/310; 206/312
[58] Field of Search ............... 206/309, 310, 312, 403, 206/404, 444; 220/4.22, 4.23, 339

[56] References Cited

U.S. PATENT DOCUMENTS

| | | | |
|---|---|---|---|
| 3,109,539 | 11/1963 | Turoff | 206/310 |
| 3,552,551 | 3/1969 | Goldberg | 206/403 |
| 3,612,233 | 10/1971 | Nagpal | 206/403 |
| 3,744,828 | 7/1973 | Goldberg | 206/404 |
| 3,949,872 | 4/1976 | Paudras | 206/310 |
| 4,084,690 | 4/1978 | Pulse | 206/310 |
| 4,407,412 | 10/1983 | Thiele et al. | 206/404 |
| 4,676,370 | 6/1987 | Rudick | 206/404 |
| 4,874,085 | 10/1989 | Grobecker et al. | 310/ |
| 4,892,189 | 1/1990 | Kunimune et al. | 206/309 |
| 4,903,829 | 2/1990 | Clemens | 206/312 |
| 5,238,107 | 8/1993 | Kownacki | 206/312 |

FOREIGN PATENT DOCUMENTS

| | | | |
|---|---|---|---|
| 217254 | 9/1986 | European Pat. Off. | |
| 2271632 | 12/1975 | France | 206/312 |
| 2243145 | 10/1991 | United Kingdom | 206/310 |

*Primary Examiner*—David T. Fidei
*Attorney, Agent, or Firm*—Keil & Weinkauf

[57] ABSTRACT

A one-part container produced by injection molding for reeled magnetic tape, for example 1" video tapes, is described, the container comprising a bottom tray and a top tray, which are connected to each other by means of a folding line provided with bends, there being provided on a bevelled-off edge of the bottom tray and of the top tray holding grip parts, which are joined together to form a holding grip when the container is closed up. The container includes inside it a hub arresting means, in the bottom part and in the top part an annular projection for receiving or supporting the reel, the reel being mounted rotatably in the interior. Furthermore, the container includes lugs on the side walls for closing by snapping in of the container. The side walls are shaped such that, by virtue of elevations which engage in correspondingly shaped grooves in the other part of the container, the content is stored in a manner protected against dust and moisture.

5 Claims, 1 Drawing Sheet

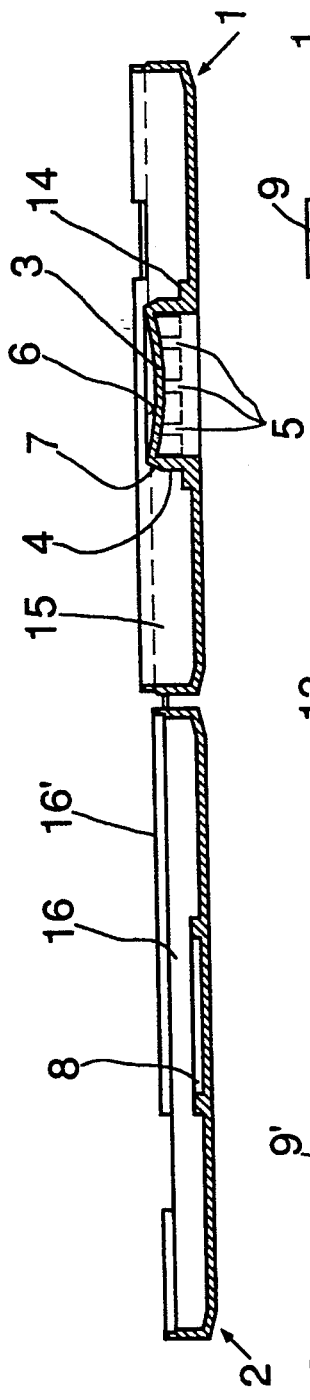
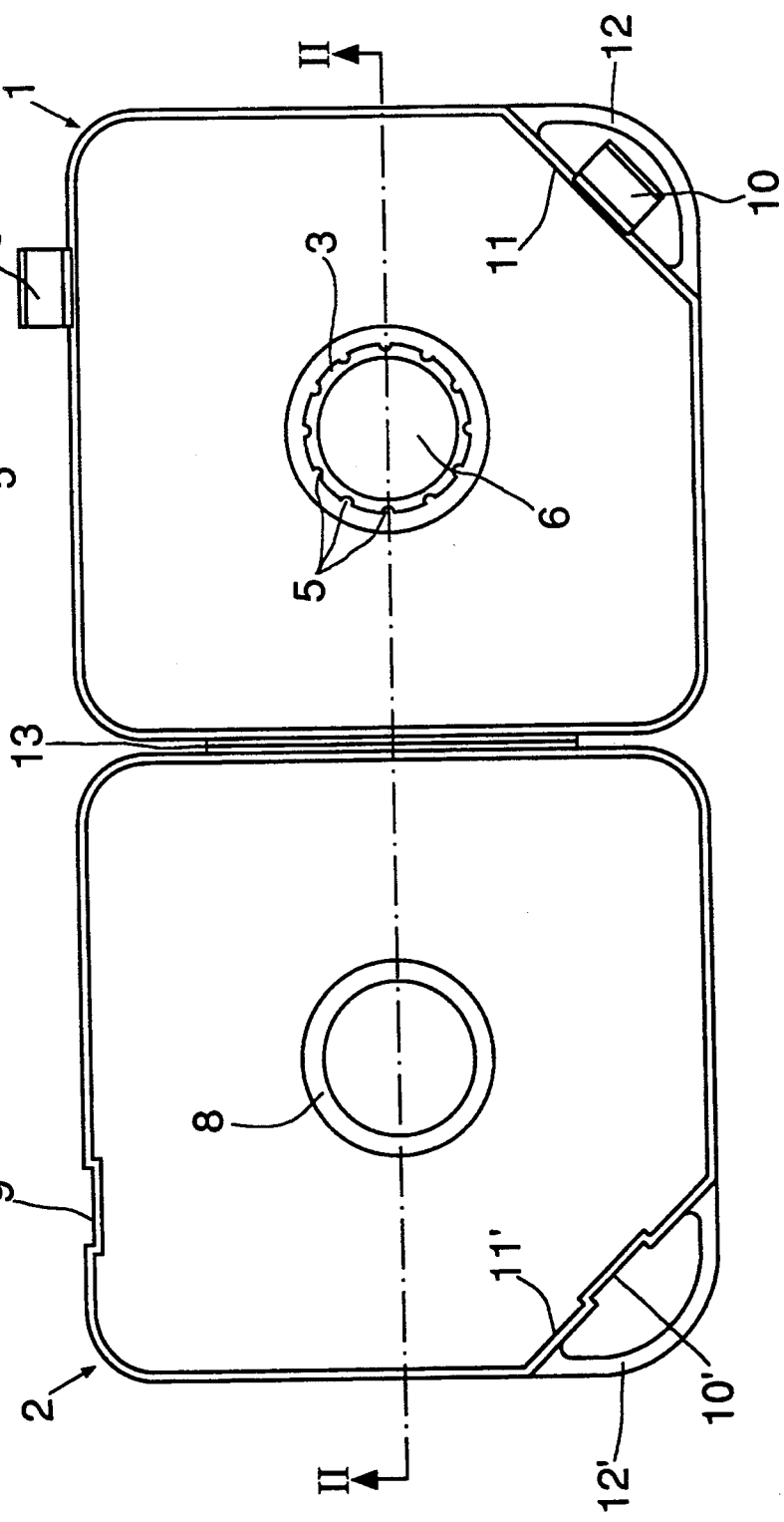

REEL CONTAINER FOR MAGNETIC TAPES

The invention relates to a one-part container which consists of plastic and can be produced by injection molding for magnetic tapes which are wound up on hubs provided with internal bores and on reels, comprising a bottom tray and a top tray which can be swivelled about a hinge line, the container being provided with a holding grip, which is formed on and extends over a bevelled-off edge lying opposite the hinge line, and the container including a closing mechanism for locking.

Reel containers of the generic type mentioned at the beginning are known, for example from EP 0,043,016 and EP 0,217,254. These containers meet the following requirements:

the rolls of magnetic tape are protected in themselves against dust the closing mechanism is safeguarded against vibration the container is relatively lightweight and robust.

Such transport containers are normally produced from polypropylene by blew molding in a double-walled configuration or in a multi-part injection-molding process. As a result, in spite of their relatively low weight, they have the disadvantage of a high space requirement, which has the effect for example in radio stations, where large numbers of such containers are stored with the magnetic tapes kept in them for archiving purposes, of an increased space requirement. In addition, the individual functional components, for example the closure elements known from EP 0,043,016, have to be fitted extra.

A further disadvantage is that the reels are seated with their internal circular bore on a hub arresting means, so that they are not rotatably mounted. If, due to dropping or the like, an external force is then exerted on the magnetic tape reel, the moment of inertia of the wound reel may cause creasing to occur in the roll of tape and consequently make the magnetic tape unusable (known as cinching).

Therefore, it is an object of the present invention to find a container of the type mentioned at the beginning in which the magnetic tape is reliably protected against external effects, for example impact, dropping, dust, moisture, and the like, it being possible for the container to be produced in a simple and inexpensive way, and the storage volume of the container being significantly reduced.

We have found that this object is achieved by a one-part container which consists of plastic and can be produced by injection molding for magnetic tapes which are wound up on hubs provided with internal bores or on flanged reels, comprising a bottom part (1) and a top part (2) with a hinge tab (13) which connects them and is provided with two bending lines, equipped with a holding grip, which is formed on and extends over a bevelled-off edge lying opposite the hinge line, and the container being equipped with a closing mechanism for locking, wherein the bottom tray (1) has in the geometrical center of its inner side a cylindrical projection (3) for fitting on the reel, the lateral surface (4) of the projection (3) having notches (5) distributed over its circumference and running in the axial direction, and the circular top surface (6) of the projection (3) being curved concavely inward the top tray (2) has projecting in the center of its inner side a circular ring (8), the inside diameter of which is greater than the outside diameter of the projection (3) of the bottom tray on at least one outer edge of the bottom or top tray there is provided a lug (9), running in the axial direction of the reel holder and bent off at the end, for snapping into a corresponding groove (9') on the other part of the container in the closed state a further, correspondingly designed lug (10) is injection-molded on the bevelled-off edge (11) within the holding grip (12) for snapping into a corresponding groove on the bevelled-off edges (11, 11') of both the bottom part and the top part there are attached mutually complementary holding grip parts (12, 12'), which engage positively in each other when the container is closed up at least one side wall (15) of the bottom or top part is elevated with respect to the other side wall (16), the elevated part entering into a corresponding groove (16') of the other container part when the container is closed up. Further details of the invention emerge from the subclaims, the description and the drawings.

The invention is explained in more detail below with reference to the drawings, in which:

BRIEF DESCRIPTION OF THE DRAWINGS

FIG. 1 shows a plan view of the container

FIG. 2 shows a corresponding cross section along the line II.

DESCRIPTION OF THE PREFERRED EMBODIMENTS

The container is produced in one-part form from recyclable plastic, preferably polypropylene, by injection molding in single-walled form. This plastic is highly impact-resistant and extremely resistant to mechanical stressing, so that the advantages of the previous double-walled container, produced by blow molding, are fully retained and, at the same time, the volume reduction aimed for is achieved. For example, in archiving, the volume reduction for a container for 1" reeled tape, a common format for professional applications in the audio and video sector in radio stations, is about 23%.

The container comprises a bottom tray (1) and a top tray (2), which are connected to each other by a hinge tab (13), provided with two bending lines. The bottom tray (1) contains in the geometrical center of its inner side as a hub or reel arresting means a cylindrical projection (3), the upper side of which may be bevelled off frustoconically (7), in order to be able to fit the reel on conveniently. In this arrangement, the lateral surface (4) of the cylindrical projection is provided uniformly over its circumference with notches (5) running in the axial direction, and furthermore the circular top surface (6) is curved concavely inward. The final feature helps to reinforce the upper side of the reel mount. As can be seen from FIG. 2, a corresponding cylindrical notched indentation on the outer side of the bottom tray corresponds to the cylindrical projection on the inner side of the bottom tray. In addition, around the projection (3) there is attached an annular base (14), on which the hub or the reel rests alongside its internal bore. The top tray (2) likewise contains on its inner side in the geometrical center an annular projection (8), the height of which is substantially smaller than the height of the projection (3) on the bottom tray and the inside diameter of the circular ring (8) is greater than the outside diameter of the projection (3) of the bottom tray.

The design features mentioned mean that the magnetic tape reel is held in a positionally stable manner only by a small proportion of its surface area on the projection (3), the base (14), the bottom part or the annular projection (8). On the other hand, the outside diameter of the cylindrical projection (3) is dimensioned such that the reel is mounted freely rotatably in the interior of the container, so that if an external force is exerted no damage can occur to the magnetic tape (cinching).

As can be seen from FIG. 1, both bottom tray and top tray include on a bevelled-off edge (11, 11'), lying opposite the connecting tab (13), holding grips (12, 12') which, arranged symmetrically with respect to each other and extending over the bevelling, are arranged to be complementary to each other, so that they unite when the container is closed up to form in the closed state a hand grip. For this purpose, the gripping parts (12, 12') may be equipped with mutually complementary projections (tongues and grooves) on their inner sides to be fitted together. Furthermore, the hand grip may be asymmetrically designed in the axial direction of the reel holder, so that, as in the case of known containers, two containers can be carried in one hand by the hand grips adjacent to each other.

Furthermore, the bottom and/or top part includes on at least one outer edge a lug (9), which extends from the side walls in the axial direction, is bent off at the end and engages in a correspondingly shaped groove (9') on the other part of the container by snapping in. In addition, in the bevelling (11, 11') lying opposite the holding grip there may be additionally provided a corresponding lug and groove (10, 10') for snapping in.

In order to protect the container reliably against the ingress of dust or moisture, the side walls (15) of one container part are elevated somewhat in comparison with the neighboring side wall (16) of the other container part, so that they enter into corresponding grooves (16') of the other container side wall (16) when the container is closed up.

As a result of the two described locking means in the outer region, the inside of the container remains free, so that inserts can also be packed. In addition, in order to permit long-time storage under constant humidity conditions, the reels may be sealed into thin plastic bags, for example of polyethylene, loosely folded, in such a way that they are not damaged when the reel is fitted onto the hub mount and the case is closed.

In addition, the outer shaping of the container according to the innovation has for the first time made it possible for the user also to use larger label formats by adhesive attachment around the edges, which means that the label may extend from the front face of the container as far as the side face.

We claim:

1. A one-part container, which consists of plastic and can be produced by injection molding, for magnetic tapes which are wound up either on hubs provided with internal bores or on flanged reels, comprising a bottom part (1) and a top part (2), with a hinge strip (13) which connects them and is provided with two bending lines to aid in permitting the rotation of the top part relative to the bottom part, allowing the container to open and close, said top and bottom parts each having an inner and an outer surface viewed with reference to the container in its closed state, said container being in plan view essentially square in shape, but with one of the corners on the side opposite the hinge strip being bevelled off, each part having attached to it a mutually complementary holding grip part (12, 12'), which grip parts serve to complete the essentially square outline of the container in plan view, said grip parts positively engaging in each other when the container is closed, and the container being equipped with a closing mechanism for locking, wherein the bottom part (1) has in the geometrical center of its inner surface a cylindrical projection (3) for fitting on the reel, the lateral surface (4) of the projection (3) having notches (5) distributed over its circumference and running in the axial direction, and the circular top surface (6) of the projection (3) being curved concavely inward the top part (2) has projecting in the center of its inner surface a circular ring (8), the inside diameter of which is greater than the outside diameter of the projection (3) of the bottom part on at least one outer edge of the bottom part there is provided a lug (9), running in the axial direction of the reel holder and bent off at the end, for snapping, with the container in the closed state, into a corresponding depression (9') provided on the outer surface of the top part of the container a further, correspondingly designed lug (10) is injection-molded in the bevelled-off edge (11) within the holding grip (12) of the bottom part for snapping into a corresponding depression provided in the top part at least one side wall (15) of the bottom or top part is elevated with respect to the other side wall (16), the elevated part entering into a corresponding groove (16') provided on the other container part when the container is closed up.

2. A container as claimed in claim 1, wherein an annular projection (14) of low height is arranged around the cylindrical projection (3) on the inner surface of the bottom part (1).

3. A container as claimed in claim 2, wherein the annular projection (8) has on the inner surface of the top part a lower height than the cylindrical projection (3) on the bottom part, and is approximately equal to the height of the annular projection (14) on the bottom part.

4. A container as claimed in claim 1, wherein the cylindrical projection (3) is bevelled off frustoconically (7).

5. A container as claimed in claim 3, wherein the diameters and the heights of the circular rings and projections (3, 8, 14) are matched with one another in such a way that a hub or reel wound with magnetic tape can be mounted freely rotatably in the interior of the container.

\* \* \* \* \*

UNITED STATES PATENT AND TRADEMARK OFFICE
CERTIFICATE OF CORRECTION

PATENT NO.: 5,361,903

DATED: November 8, 1994

INVENTOR(S): THIELE

It is certified that error appears in the above-identified patent and that said Letters Patent is hereby corrected as shown below:

ON THE TITLE PAGE

Under Assignee:
 "Maonetics" should read -- Magnetics --.

Signed and Sealed this

Third Day of January, 1995

*Attest:*

BRUCE LEHMAN

*Attesting Officer*     Commissioner of Patents and Trademarks